Figure 1:
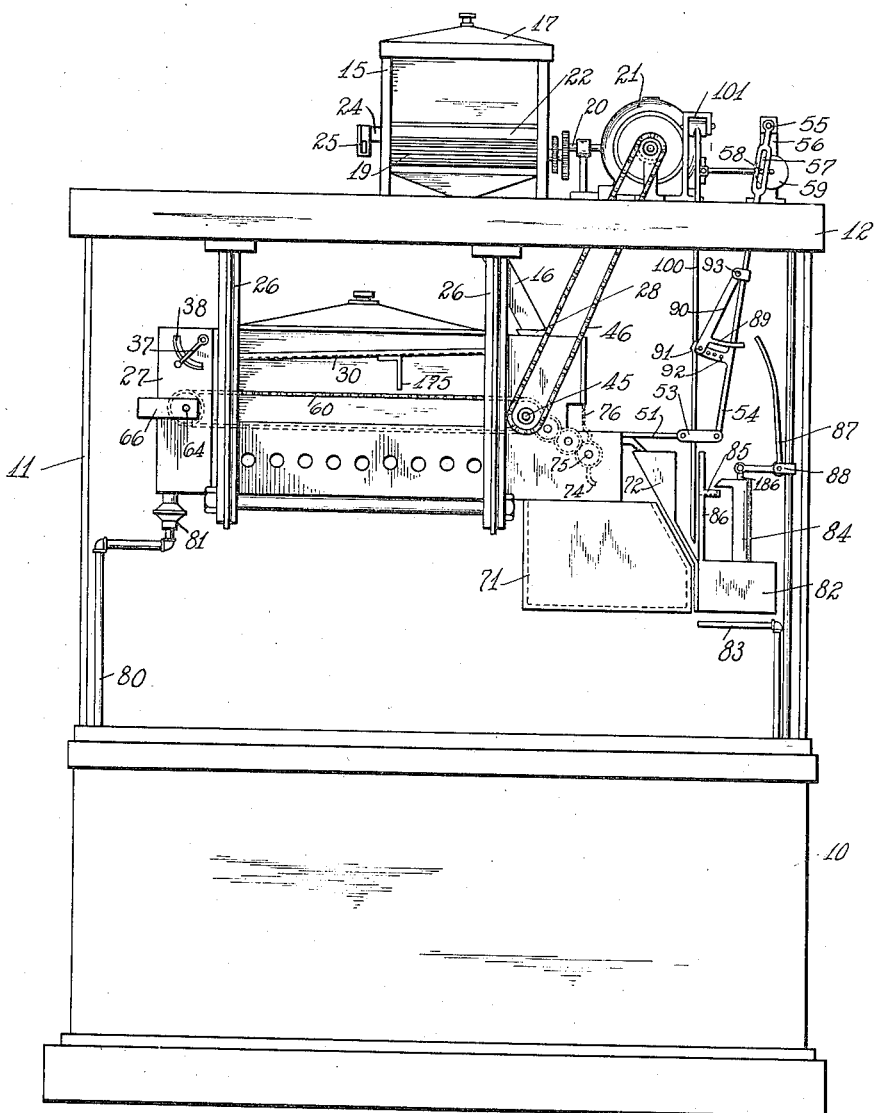

D. H. TALBERT.
CORN POPPING MACHINE.
APPLICATION FILED JAN. 9, 1915.

1,165,556.

Patented Dec. 28, 1915.
3 SHEETS—SHEET 1.

WITNESSES:
INVENTOR
Daniel H. Talbert
BY
ATTORNEY

D. H. TALBERT.
CORN POPPING MACHINE.
APPLICATION FILED JAN. 9, 1915.

1,165,556.

Patented Dec. 28, 1915.
3 SHEETS—SHEET 2.

WITNESSES:

INVENTOR.
Daniel H. Talbert
BY
ATTORNEY.

D. H. TALBERT.
CORN POPPING MACHINE.
APPLICATION FILED JAN. 9, 1915.

1,165,556.

Patented Dec. 28, 1915
3 SHEETS—SHEET 3.

WITNESSES:

INVENTOR.
Daniel H. Talbert
BY
ATTORNEY.

UNITED STATES PATENT OFFICE.

DANIEL H. TALBERT, OF INDIANAPOLIS, INDIANA.

CORN-POPPING MACHINE.

1,165,556. Specification of Letters Patent. Patented Dec. 28, 1915.

Application filed January 9, 1915. Serial No. 1,355.

*To all whom it may concern:*

Be it known that I, DANIEL H. TALBERT, a citizen of the United States, and a resident of Indianapolis, county of Marion, and State of Indiana, have invented a certain new and useful Corn-Popping Machine; and I do hereby declare that the following is a full, clear, and exact description thereof, reference being had to the accompanying drawings, in which like letters refer to like parts.

The object of this invention is to improve and simplify the construction and operation of continuously operative corn popping machines and enable them to improve the quality of the popped corn and reduce the waste of unpopped corn.

One feature of the invention consists in having a stationary heated popping plate with a reciprocating agitator on the surface thereof and a continuously moving guide conveyer above the same for gradually removing the popcorn from the popping plate and slowly feeding the unpopped corn over the surface of the plate to the discharge end thereof. The invention, however, is not limited to the precise arrangement just mentioned as it is not altogether material as to which of said members is stationary and reciprocable. The conveyer preferably has drag chains which engage the popped corn only on the popping plate and gradually remove it from said plate and through the movement of the popped corn on said plate, a corresponding but more gradual feeding movement of the unpopped corn thereon is effected. This feeding movement of the unpopped corn is retarded by the cross bars of the agitating means so that before the unpopped corn reaches the discharge end of the popping plate, it will have ample opportunity to have become popped. This greatly reduces the waste.

Another feature of the invention consists in providing a chain curtain above the discharge end of the popping plate which prevents the escape of the popped corn by reason of the explosions thereof, but permits said fingers to move the popped corn through the lower portion of the curtain and discharge the same from the popping plate. There is also a baffle plate provided for preventing the escape of unpopped corn as it flies up during the popping of other grains.

Another feature of the invention consists in providing a preheating plate above the popping means and heated by the same heating means as heats the popping plate. This plate has a jerky oscillatory movement longitudinally and is slightly inclined and the corn is fed upon one end thereof and very slowly travels by the shaking movement of the plate to the other end where it falls down upon the popping plate and in such slow travel the grains become thoroughly dried and warm so as to facilitate the popping thereof when the grains reach the popping means and to materially reduce the number of grains which will not pop. With the combined preheating means and the popping means above described, a greatly reduced percentage of popcorn is wasted.

Figure 2:
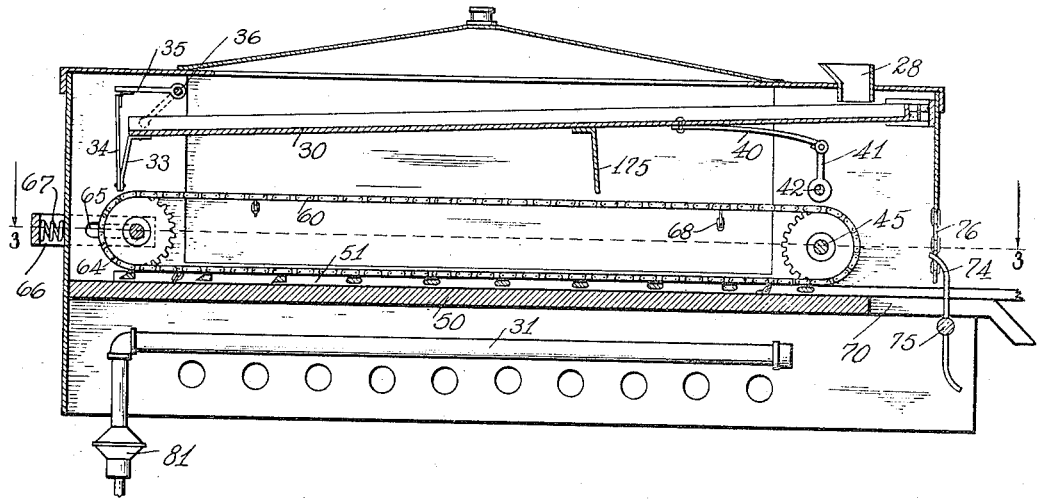
Figure 3:
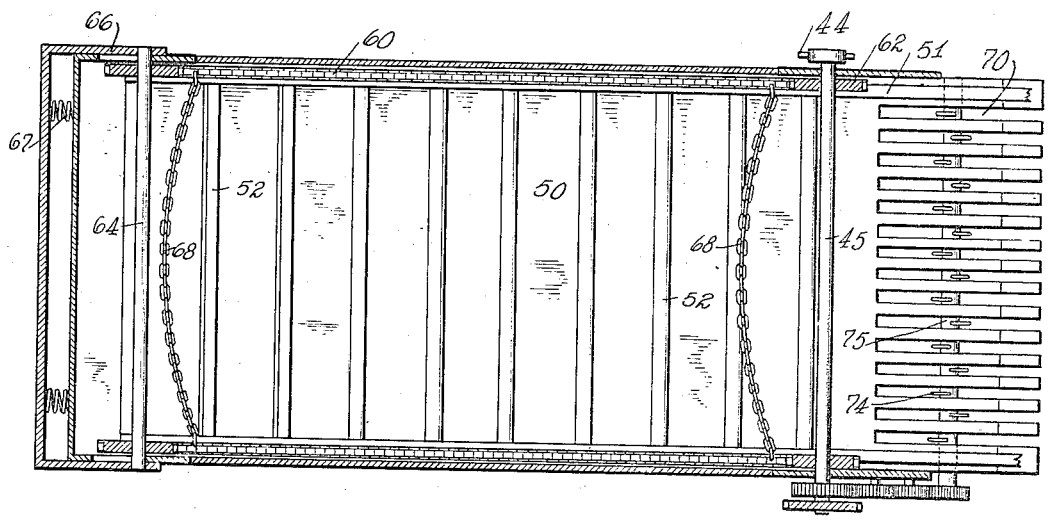
Figure 4:
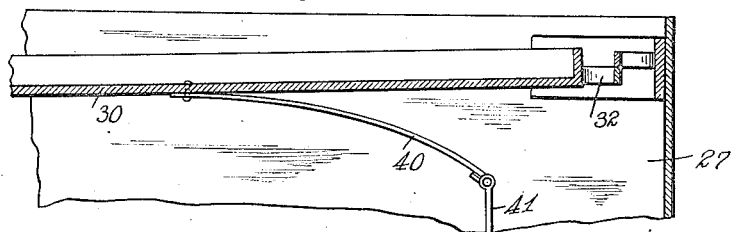
Figure 7:
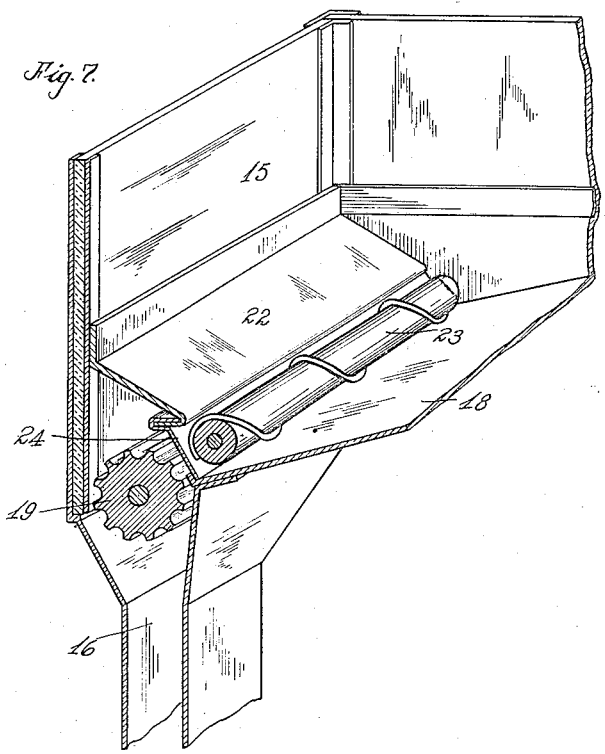
Figure 5:
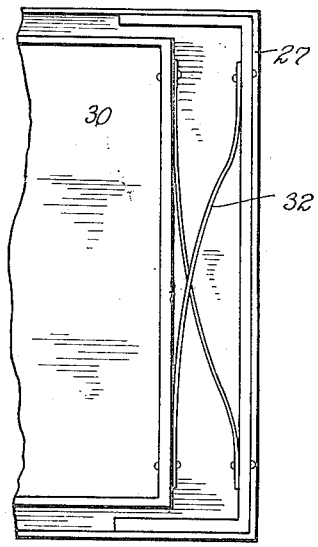
Figure 6:
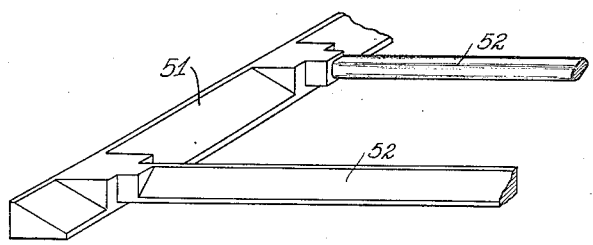

The full nature of the invention will be understood from the accompanying drawings and the following description and claims:

In the drawings, Figure 1 is an elevation of the machine. Fig. 2 is a central vertical section through the popper. Fig. 3 is a section on the line 3—3 of Fig. 2. Fig. 4 is a detailed view showing the means for shaking the popcorn preheating means, the actuating means being shown by dotted lines. Fig. 5 is a plan view of the right-hand end of Fig. 4. Fig. 6 is a perspective view of a portion of the stirring means on the popping plate. Fig. 7 is a view partially in section and partially in perspective of the popcorn feeding means, parts being broken away.

A stand 10 has upon it a glass case 11 having a wooden top 12. A hopper 15 is mounted on the top 12 of the casing and has a discharge chute 16 extending down to the popping means below the top 12 of the casing 11. The hopper has a lid 17 and the bottom of the hopper is formed chiefly by inclined plates 18 leading downward to a corrugated feeding cylinder 19 in the discharge throat of the hopper and immediately above the chute 16, as shown in Fig. 7. The feed cylinder 19 is driven directly by a shaft 20 mounted on the top 12 of the casing and driven indirectly from a motor 21. Another inclined plate 22 in the bottom of the hopper 15 extends toward the inclined plate 18, but is spaced away from it and between said two plates there is a screw feed shaft 23 mounted and the space between the two plates 18 and 22 is closed by a plate 24 longitudinally slidable in connection with the bottom plates 18 and 22. The feed screw 23 is driven by the same means that drives the feed cylinder 19. Said feed cylinder has longitudinal corrugations in it deep enough to receive and hold grains of popcorn. Therefore, as the popcorn is fed from the hopper through an outlet opening formed by withdrawing the plate 24 to the desired extent, it lodges in the corrugations on top of the feed cylinder and as said cylinder revolves, the grains are discharged down through the chute 16. When the hopper is closed, the sliding plate 24 extends from end to end. The rapidity of feed is determined by the extent of opening formed by withdrawing plate 24 longitudinally and for that purpose the plate 24 extends outside the hopper, as seen in Fig. 1, and has a handle 25 thereon. If it be desired to increase the feed, the slide 24 is withdrawn more and more. The screw 23 will feed the corn toward the outlet opening however large or small it may be.

The popping mechanism appears best in Figs. 1 and 2. Supports 26 extend down from the top 12 of the casing whereby a popping casing 27 is supported. This casing has a closed top with a corn inlet 28 into which the lower end of the chute 16 projects and through which it discharges the corn.

The corn first falls on the preheating plate 30 which is inclined so that the corn may travel by gravity very slowly from the end thereof upon which it is deposited to the other end. This plate is above the heater 31 so that it is kept hot and it is shaken in order to keep the corn moving and prevent it becoming too hot at one point. The high end of said preheating plate is supported by a pair of springs 32, as shown in Fig. 5. Each of these springs is secured at one end to the plate 30 and at the other end to the frame and cross each other diagonally. The lower end of plate 30 is pivotally supported on the upper end of a spring bar 33 which is secured at its lower end to a companion spring bar 34, which is pivoted at its upper end to an arm 35 pivoted at 36 in the casing 27 and an adjusting bar 37 extends outside the case and is held in adjusted position by segmental rack bar 38, whereby said plate 30 is reciprocally supported and its lower end may be vertically adjusted to change its inclination, and the movement of the corn. Said plate is given a quick rearward movement by a connecting spring bar 40, one end of which is secured to said plate and the other end pivoted to a crank 41 extending up from a shaft 42, as shown in Fig. 4. There is an arm 43 extending from the outer end of said shaft 42 in position to be engaged by a diametrical rod or arm 44 on a shaft 45 which is driven by a belt 46 from the motor 21, as shown in Fig. 1, at each half revolution of the shaft 45. Therefore, the preheating plate 30 is given a sudden rearward movement and then it is quickly returned by the springs 32 to its normal position and said movement is constantly repeated so as to shake the plate in a jerky manner and cause the slow travel of the corn on its plate.

The timing of the movement of the corn over the preheating plate 30 is effected by elevating and lowering the forward end of the plate which may be accomplished by turning the bar 36 to which is rigidly connected the bar 35. The corn does not pop on the plate 30 but merely becomes preheated and to a rather high degree of temperature so that it is about ready to pop. It falls over the lower and advancing edge of the preheating plate and descends upon a popping plate 50 which, in this machine, is stationary. The movement of the popcorn over the popping plate is effected by two coöperating means. In the first place there is an agitating frame reciprocated upon the popping plate and consisting of side bars 51 and cross bars 52, see Fig. 6. This frame is reciprocated by a connecting rod 53, see Fig. 1, pivotally connected with a lever 54 which is fulcrumed at its upper end at 55 to a frame 56 upon the top 12 of the machine. Near its upper end said lever 54 has a longitudinal slot 57 through which a wrist pin 58 in an eccentric wheel 59 loosely projects. Said wheel 59 is driven by means not shown from the motor 21.

Coöperating with the frame there is an endless drag conveyer formed of lateral sprocket chains 60 and transverse sagging chains 68. The conveyer operates on pulleys 62 secured on a shaft 64 at the other end. Said shaft 64 is mounted in the slots 65 in the end of a frame 66, which extends rearwardly of the main frame and springs 67 are mounted between the frame 27 and the cross bar of said frame 66 so that the springs tend to force the frame 66 away from the frame 27 and this holds the belt 60 taut. This drag conveyer is so mounted that the sagging chains 68 drag the popped corn over the popping plate 50 to the discharge end. As this operation is in progress, the "shot" or unpopped corn is gradually moved by the movement of the popped corn over the cross bars 52 of the agitating frame and said cross bars tend to resist this action. The drag chains do not touch the popping plate 50, but drags the popped corn and, indirectly, the "shot" over the cross bars 52 of the agitating frame. At the left-hand end of said agitating frame said cross bars are beveled, as shown in Fig. 6, so that the "shot" can be more readily moved over the first few bars, but the bevel diminishes from bar to bar in the progress of the "shot" so that they increasingly tend to resist the feeding movement of the "shot", over the popping plate. This is to keep the "shot" agitated and moving in the same direction as the popped corn, but to bring it repeatedly down upon the popping plate for the purpose of effectually popping it before it leaves the popping plate. The side bars 51 of the agitating frame are beveled to prevent the accumulation of "shot" thereon.

The agitating frame and the drag conveyer coöperate together so well on the stationary popping plate that it is impossible for any popcorn capable of popping to avoid being popped for ample opportunity is given the same to be preheated and afterward popped.

When the popped corn and "shot", if there be any "shot", reaches the discharge end of the popping plate 50, the "shot" drops down through the slots 70, see Fig. 3, into a "shot" receptacle 71. The popped corn is too large to enter said slots, and, therefore, they pass on over the downturned end of the plate 50, as seen in Fig. 1, and are discharged upon an inclined plate 72 which leads to the buttering means.

To facilitate the separation of the "shot" from the popped corn, a series of arms 74 with backwardly turned ends is centrally mounted on a shaft 75, so the arms rotate through the slots 70, going through the inner ends of said slots upwardly and thus lifting the "shot" and popped corn so that the "shot" will separate and fall through the slots and the popped corn will be carried on to the discharge end of the plate 50.

To prevent the popped corn and the "shot" kicked up by the popped corn during the explosions from escaping, a baffle plate 175 is secured to the underside of the preheating plate 30. There is a chain curtain 76 suspended over the series of slots 70 and in position to be engaged by the rotating arms 74. Said arms passing in their rotation through the curtain, carry the popped corn through the curtain. Hence, the curtain prevents the corn from popping out over the discharge end of the popping plate. Gas is supplied to the heater 31 through a pipe 80 and mixer 81.

The butter in receptacle 82 is kept in fluid condition by a gas heater 83 and it is pumped up through a pump 84 and discharged upon an apron 85 that causes the flow through a stationary partition 86 upon the popped corn which lodges between the inclined plate 70 and the vertical plate 62. A pump rod 186 is actuated by a bell crank lever 87 fulcrumed to a bracket 88 and actuated by an arm 89 adjustably mounted on the lever 54. With each operation of the lever 54, one operation of the lever 87 is obtained. And the extent of the pump action is adjusted by the free end of a bar 90 from which the arm 89 extends having a hole in it for a pin 91 to be inserted therethrough and into one of the series of holes in a segmental plate 92. The bar 90 is pivoted at its other end at 93 to the lever 54.

A finger 100 discharges the popped corn from the buttering device, it being mounted on a bracket 101 and oscillated from the motor 21 by means not fully shown, as it is not new in this sort of a machine.

The invention claimed is:

1. In a popcorn machine, the combination of a substantially horizontal popping plate, an agitator thereon, and means above the agitator for engaging and removing the popped corn, one of said members being stationary, another reciprocatory and the third movable in one direction, for the purpose set forth.

2. In a popcorn machine, the combination of a stationary popping plate, a reciprocable agitating frame thereon, and means for engaging and moving the popped corn movable parallel with said popping plate and immediately above said agitating frame.

3. In a popcorn machine, the combination of a popping plate, an agitating frame thereon, and means movable parallel with said popping plate which drags immediately above the agitating frame for engaging and removing the popped corn.

4. In a popcorn machine, the combination of a popping plate, an agitating frame thereon, and a drag conveyer with its lower side moving parallel with the popping plate and immediately over said agitating frame.

5. In a popcorn machine, the combination of a popping plate, an agitating frame thereon having cross bars, and means movable parallel with the popping plate immediately over said cross bars for giving the popcorn a feeding movement on the popping plate.

6. In a popcorn machine, the combination of a popping plate, an agitating frame thereon having cross bars, and means movable parallel with the popping plate immediately over said cross bars for giving the popcorn a feeding movement on the popping plate, the cross bars of the agitating frame reached by the popcorn in the first part of its movement over the popping plate being beveled and gradually thereafter increasing the resistance to the movement of the popcorn.

7. In a popcorn machine, the combination of a popping plate, an agitating frame thereon having cross bars, and means provided with transversely extending chains adapted to be dragged immediately above the agitating frame and popping plate.

8. In a popcorn machine, the combination of a popping plate, an agitating frame thereon having cross bars, and means provided with transversely extending chains adapted to be dragged immediately above the agitating frame and popping plate, the side bars of said agitating frame being beveled on the inner edges to prevent the accumulation of corn thereon.

9. In a popcorn machine, the combination of a popping plate, an agitating frame thereon with transverse bars, and an endless drag conveyer mounted above said popping plate with the lower portion thereof movable parallel with the popping plate and immediately above the cross bars of the agitating frame.

10. In a popcorn machine, the combination of a popping plate, an agitating frame thereon with transverse bars, an endless drag conveyer mounted above said popping plate with the lower portion thereof movable parallel with the popping plate and immediately above the cross bars of the agitating frame, and yielding means for mounting said drag conveyer and maintaining it taut.

11. In a popcorn machine, the combination of a popping plate, an agitating frame thereon with transverse bars, an endless drag conveyer mounted above said popping plate with the lower portion thereof movable parallel with the popping plate and immediately above the cross bars of the agitating frame, a casing in which said parts are mounted, a shaft mounted in said casing with sprocket wheels thereon for supporting one end of the conveyer, a shaft with sprocket wheels thereon for supporting the other end of the conveyer, one of said shafts extending through horizontal slots in the casing, a yoke-shaped frame secured to the outer ends of said last-mentioned shaft and extending around one end of the casing, and springs between the casing and said frame tending to move said last-mentioned shaft in a direction away from the first-mentioned shaft for holding the conveyer taut.

12. In a popcorn machine, the combination of a reciprocatory preheating plate, a horizontal popping plate below the preheating plate in position to receive the corn therefrom, and heating means below said popping plate for heating both plates, whereby the popping plate will be hotter than the preheating plate.

13. In a popcorn machine, the combination of an inclined preheating plate, a stationary popping plate under said preheating plate and adapted to receive the corn as it drops from said preheating plate, and means for agitating the popcorn on said popping plate.

14. In a popcorn machine, the combination of an inclined preheating plate, means for vibrating said plate, a popping plate under said preheating plate and adapted to receive the corn as it drops from said preheating plate, and means for agitating the popcorn on said popping plate.

15. In a popcorn machine, the combination of an inclined preheating plate, intermittently operated means for giving said plate sudden repeated movements in one direction, springs for returning said plate after each of said movements, a popping plate under said preheating plate and adapted to receive the corn as it drops from said preheating plate, and means for agitating the popcorn on said popping plate.

16. In a corn popping machine, the combination of an inclined preheating plate, means for adjusting the elevation of the lower end thereof, intermittently operated means for giving said plate sudden repeated movements in one direction, springs for returning said plate after each of said movements, a popping plate under said preheating plate and adapted to receive the corn as it drops from said preheating plate, and means for agitating the popcorn on said popping plate.

17. In a popcorn machine, a popping plate, means beneath the popping plate for heating the same, an endless conveyer immediately above the popping plate, and an inclined preheating plate located immediately above the conveyer and adapted to discharge corn on the popping plate.

18. In a popcorn machine, a popping plate, means beneath the popping plate for heating the same, an endless conveyer immediately above the popping plate, an inclined preheating plate located immediately above the conveyer and adapted to discharge corn on the popping plate, and a transversely extending baffle plate secured to the underside of the preheating plate and extending down into close proximity with the conveyer.

In witness whereof, I have hereunto affixed my signature in the presence of the witnesses herein named.

DANIEL H. TALBERT.

Witnesses:
J. H. WELLS,
R. G. LOCKWOOD.